April 11, 1933. A. J. DOTTERWEICH 1,903,611
WATER SOFTENING APPARATUS
Filed Dec. 27, 1927
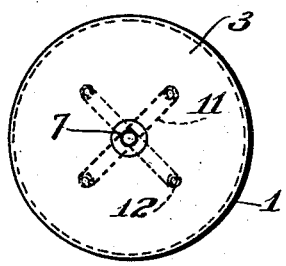
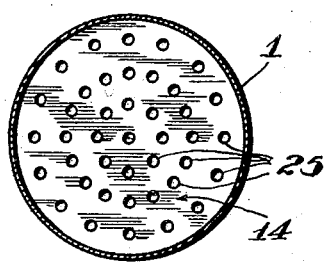
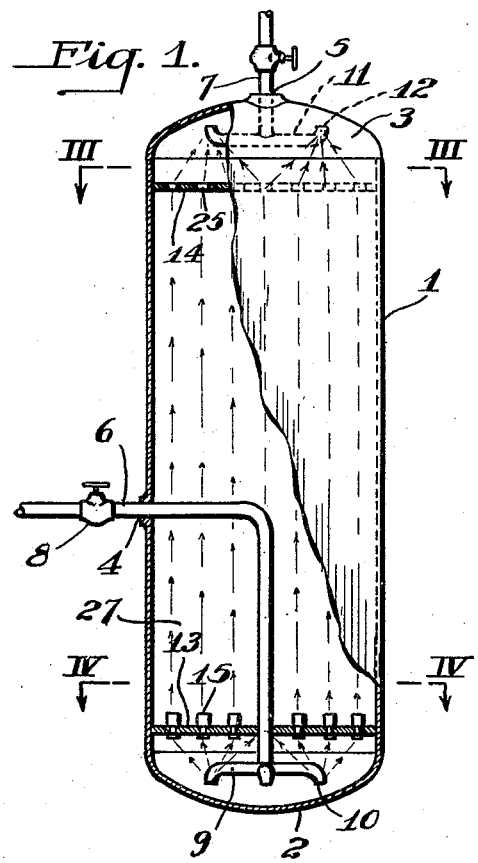
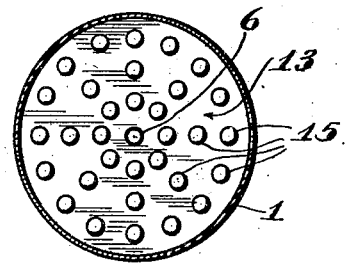
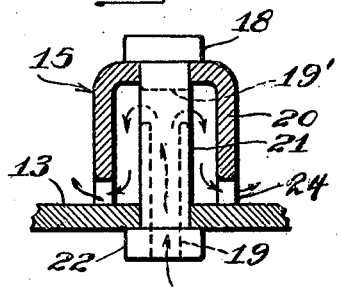
WITNESS
INVENTOR
Andrew J. Dotterweich
by William B. Jaspert
his Attorney.

Patented Apr. 11, 1933

1,903,611

UNITED STATES PATENT OFFICE

ANDREW J. DOTTERWEICH, OF PITTSBURGH, PENNSYLVANIA, ASSIGNOR TO AUTOMATIC WATER SOFTENER COMPANY, OF PITTSBURGH, PENNSYLVANIA, A CORPORATION OF DELAWARE

WATER SOFTENING APPARATUS

Application filed December 27, 1927. Serial No. 242,612.

This invention relates to improvements in water softening apparatus of the type employing a softening material such as zeolite, and it is among the objects thereof to provide for greater efficiency and economy in the utilization of the regenerating material and to generally improve the efficiency of the softening apparatus by the utilization of the mechanical action of the water passing through the softener.

Another object of the invention is to provide an improved method for backwashing, regenerating and flushing the softening material whereby the use of gravel beds may be entirely dispensed with, thus permitting more zeolite to be employed for a given volume of container and whereby the use of salt or other regenerating agent is reduced to a minimum.

Another object of the invention is to provide water softening apparatus which shall be especially adapted to effect a uniform distribution of the water supply through the softening material and which shall be adapted to quickly remove the salt or regenerating material from the softening material before the apparatus is restored to its normal function of softening water.

In the regeneration of the softening material such as zeolite, a salt solution is passed through the zeolite bed and the brine is subsequently flushed out of the zeolite by raw water.

I have discovered that when a salt solution is passed upwardly through a settled bed of zeolite, it requires a large volume of such solution to expand the zeolite bed and in expanding the bed from a settled state to full expansion the salt solution has a tendency to follow the lines of least resistance forming channels through the bed and permitting large globules of brine to pass directly through the bed without an opportunity for the salt contained within such globules to come in contact with and to act upon the zeolite resulting in waste of salt.

To overcome these difficulties I expand the zeolite bed in the softening tank by a backwashing operation prior to the salting operation and so distribute and apply the water utilized for this purpose that the zeolite particles are loosened up to such an extent that the entire bed will be expanded in the softening tank. By so preparing the zeolite bed preliminary to the application of the salt solution, the salt solution in passing through the zeolite will come in intimate contact with the zeolite and be uniformly distributed throughout the expanded bed to effect an efficient use of the salt for regeneration, and I further distribute the flow of the salt solution in the same manner as in the backwashing operation to assure the effective application of the salt with the result that a minimum quantity of salt will regenerate the zeolite in a minimum amount of time. Similarly, the distribution of raw water throughout the zeolite bed in the above designated manner produces intimate contact of the water with the zeolite, resulting in better efficiency of the softener.

In the accompanying drawing constituting a part hereof and in which like reference characters designate like parts, Fig. 1 is a sectional elevational view of a water softening tank embodying the principles of my invention; Fig. 2 is a top plan view thereof; Figs. 3 and 4 sectional plan views taken along lines III—III and IV—IV, Fig. 1; and Fig. 5 an enlarged detail view partly in section of a special form of strainer nozzle utilized in the manner hereinafter explained.

Referring to Fig. 1 of the drawing, the structure therein illustrated comprises a tank 1 having a bottom inlet chamber 2 and top outlet chamber 3 and being provided with an inlet 4 and top outlet 5 adapted to receive pipe lines 6 and 7 respectively.

The line 6 is connected to a source of raw water supply and a source of brine in a manner as set forth for example, in my Patent No. 1,834,387, dated December 1, 1931, or it may be so connected by any suitable system of piping or tanks. The line is further provided with a valve 8 and projects into the tank 1 and downwardly in the manner shown, terminating in the bottom portion of the tank into the center of a distributor head 9 having outlet nozzles 10 in angularly spaced relation. The pipe line 6 is connected to the center of the distributor head to deliver a uniform volume of water at the respective outlets 10 for a purpose hereinafter explained in connection with the operation of the softener. The outlet pipe 7 at the top of the tank projects into the tank and is provided with a collector comprising arms 11 similar to the arms 9 and having nozzles 12 through which the water passes into the outlet 7.

A pair of perforated plates 13 and 14 are disposed intermediate the distributor and collector arms 9 and 11 being spaced a short distance therefrom as shown in Fig. 1. The bottom plate 13 is provided with a plurality of strainer nozzles 15 which are radially and angularly spaced as shown in Fig. 4 as illustrated in the enlarged view of Fig. 5.

The nozzles consist of a bolt 18 having a passage 19 projecting centrally thereof and opening at both sides as shown at 19' in Fig. 5. A thimble or sleeve 20 having an opening adapted to receive the body portion 21 of the bolt 18 is clamped to the plate 13 by passing the bolt therethrough and securing the same underneath the plate by a screw nut 22. The sleeve 20 is provided with a plurality of cutout portions 24 constituting outlets to permit water flowing through the passage 19 to escape to the interior of the sleeve 20 and to flow outwardly into the tank adjacent the upper surface of the plate 13. By the use of this construction the outlets 24 are constantly flushed to prevent the clogging of the nozzles by the zeolite material as well as to flush out any salt solution which may become pocketed on the top side of plate 13.

The upper plate 14 is provided with perforations 25 distributed in the manner illustrated in Fig. 3 of the drawing, it being understood however that this particular arrangement of perforations and nozzles shown in Figs. 3 and 4 may be modified for the operation of the softening apparatus in the manner hereinafter explained.

By utilizing the strainer nozzles shown in Fig. 5 in combination with the plate 13, I have found that the usual gravel bed may be dispensed with and that the zeolite 27, Fig. 1 may be charged into the tank directly on the plate 13. This is of great advantage in that it permits charging the softening tank with the zeolite before shipping as no mixing or displacement of the bed can result from the handling of the tank, the material being properly located when the tank is assembled in its upright position for use. Furthermore, the space formerly occupied by the gravel bed may be utilized for an additional amount of zeolite.

Referring to Fig. 1 of the drawing, the zeolite may utilize a substantial portion of the space between the plates 13 and 14, there being no definite amount of zeolite for a given volume of tank space except that provision must be made to allow sufficient space above the zeolite for expanding the latter preliminary to the regeneration thereof and for the softening operation.

Openings 25 in member 14 and outlets 12 are of such area as to cause a slight but not objectionable loss of head when water or brine is passing therethrough at a normal rate of flow for the purpose of effecting even distribution of flow through tank 1.

The operation of the apparatus is briefly as follows:—When the zeolite in the tank becomes ineffective for softening the water passing therethrough, the proper connections are effected to shut off the line leading to the point of use and to connect the upper portion of the softening tank with the drain. Raw water is then conducted through pipe line 6 to the bottom of the tank where it is distributed first through the outlets 10 of the arms 9 and subsequently through the perforations of partition 13 whence is passes through the strainer nozzles 15 to be uniformly conducted through the zeolite bed. The water is advanced with sufficient force to effect expansion of the zeolite and to loosen or expand the same throughout so that during the backwashing operation the space occupied by the zeolite is materially increased. The pipe line 6 is then connected to a suitable source of salt solution to conduct the solution through the expanded zeolite bed by passing it from the bottom through the strainer nozzles 15 of the partition member 13 and thence through the expanded zeolite, the salt solution passing uniformly throughout the zeolite bed to the top and then through the outlets 12 to the drain.

The salt solution is applied to the zeolite preferably at a slower rate than the flow of the flushing and expanding water to obtain better and longer contact of the salt solution with the zeolite.

By constructing the strainer nozzles in the manner explained in connection with Fig. 5, the salt is continuously flushed from the top of the partition member 13 and is not permitted to settle or pocket on the upper side of member 13, the strainer nozzles being constructed with outlet passages at the bottom for this purpose. For the same reason the zeolite cannot pass through the openings 24 of the nozzles and into the interior of the sleeve portions as the force of the flow is sufficient to keep the passages open. When the bed is settled the zeolite does not enter into the sleeves 20 of the strainer nozzles since it becomes wedged by its own weight. The zeolite cannot work up to openings 19' of the nozzle regardless of the position of the tank when handled during shipment.

Although distribution of the water or salt solution at the bottom of the tank is provided for by the use of the spaced strainer nozzles on the perforated partition member 13, the liquid would not rise uniformly throughout the zeolite bed unless provision were made at the top or outlet portion of the tank by the employment of a collecting means, causing the fluid to flow in substantially straight vertical paths through the entire length of the tank occupied by zeolite. If for example, the plate 14 were dispensed with, and the outlet was constituted by a single passage, the water flowing from the strainer nozzles 15 at the bottom of the tank would flow in a straight line from the nozzles to the single outlet in the center of the tank, but with the arrangement of the perforations 25 in plate 14 and the spaced outlet arms 11 the fluid is made to pass in substantially a straight line between the strainer nozzles 15 and perforations 25 parallel to the wall of the tank, whereby churning of the water in the upper part of the tank is eliminated and uniform distribution of fluid through the zeolite bed is obtained.

In providing for uniform distribution of flow from the bottom to the top of the tank, it is essential to first distribute the fluid at the inlet and second to collect it through a plurality of spaced outlets. This is accomplished by the angularly spaced nozzles 10 and 12 at the inlet and outlet connections respectively. The inlets 10 of arms 9 are located intermediate the outer wall of the tank and inlet pipe 6 in such manner that fluid flowing from the inlets 10 has substantially the same length of path to the strainer nozzles 15 near the outer periphery of plate 13 as to the nozzles 15 nearest the center of the plate, as graphically illustrated in Fig. 1. With this arrangement, a substantially uniform volume of fluid passes out of the several strainer nozzles 15 into the zeolite bed. Similarly, the location of the perforations 25 in the upper plate 14 and the location of the outlets 12 and arms 10 produce a substantially uniform path of travel of the fluid through the zeolite and tank. It is further obvious that uniform distribution of flow through the zeolite bed may be effected without the use of perforated partitions by providing inlets and outlets of sufficient number and in suitably spaced relation to establish equal distance of flow from the inlet to the outlet passages of the softener. The location of the strainer nozzles and perforations may be mathematically determined in accordance with the volume of flow desired and the cross-sectional area of the zeolite bed.

After the salt solution has passed through the zeolite raw water is passed through the zeolite bed from the bottom of the tank to the top of same to flush the zeolite material until free of brine and the apparatus is then in proper condition again for use in supplying softened water to the service line.

If for any reason a sediment forms at the bottom of the tank, that is, below partition member 13, the flow of raw water through the tank may be reversed. The path of flow will then be from outlets 12 through perforations 25 thence through strainer nozzles 15 to the openings 10 of branch pipe 9 and out. Any sediment will thus be flushed out preliminary to regenerating the zeolite as heretofore explained.

It is evident from the foregoing description of this invention that by expanding the zeolite bed preliminary to regeneration, the salt solution may be effectively employed, resulting in a material saving of salt which otherwise passes through channels formed in the bed of softening material without acting upon all of the zeolite, thus requiring larger quantities of salt and prolonging the regenerating operation for a considerable period.

It is further evident that by virtue of the increased efficiency of the apparatus for the several operations of softening, backwashing, salting and flushing, the apparatus will be available for longer periods of softening with less interruption for regeneration whereby the usefulness of the apparatus is increased.

Although I have described one embodiment of the invention it will be obvious to those skilled in the art that various modifications may be made, as for example, the strainer nozzles may be dispensed with and other forms of elements may be employed for distributing the flow of fluid through the tank without departing from the principles herein set forth.

I claim:

1. In a water softening apparatus comprising a tank, a partition member for supporting a softening material within the tank, and a plurality of strainer nozzles for distributing the flow of fluid through said tank, each of said nozzles comprising a cup shape member, and a bolt for fastening said cup shape member, said bolt having a central bore opening on one side of the partition and a communicating transverse bore opening inside of said cup member, and said cup member having a serrated face for engaging said partition member.

2. In a water softener having a bed of granular water-softening material through which water flows vertically, bed supporting means comprising a perforated flow-distributing plate having its perforations equipped with strainer nozzles consisting of inverted cup-shaped members on the upper side of the plate and bolts extending through the plate openings within said inverted cup-shaped members and connecting said members to the plate, said bolts having bores open at their lower ends and communicating by lateral passages with the interiors of said cup-shaped members at their upper ends, the discharge openings from said cup-shaped members being at their lower extremities immediately adjacent the upper surfaces of said plates.

3. In a water softener in which water flows vertically through a bed of granular water-softening material, means for distributing the flow to or from one end of the bed comprising a perforated plate having its perforations equipped with strainer nozzles projecting from the side of the plate next the bed, said nozzles consisting of cup-shaped members the rims of which are adjacent the side of the plate next the bed and bolts fitted in the plate perforations and extending within said cup-shaped members and connecting them to said plate, said bolts having bores open at their ends at the opposite side of the plate and communicating by lateral passages with the interiors of said cup-shaped members, said members being in communication with the bed through passages at their rims immediately adjacent the surface of the plate from which the members project.

In testimony whereof, I have hereunto set my hand.

ANDREW J. DOTTERWEICH.